United States Patent
Cavalcante De Albuquerque

(10) Patent No.: US 11,608,844 B2
(45) Date of Patent: Mar. 21, 2023

(54) METHOD FOR MANUFACTURING FURNITURE USING EXTRUDED POLYMER PROFILES

(71) Applicant: André Cavalcante De Albuquerque, Rio Grande do Sul (BR)

(72) Inventor: André Cavalcante De Albuquerque, Rio Grande do Sul (BR)

( * ) Notice: Subject to any disclaimer, the term of this patent is extended or adjusted under 35 U.S.C. 154(b) by 725 days.

(21) Appl. No.: 16/324,932

(22) PCT Filed: Aug. 9, 2017

(86) PCT No.: PCT/BR2017/050225
§ 371 (c)(1),
(2) Date: Feb. 12, 2019

(87) PCT Pub. No.: WO2018/032077
PCT Pub. Date: Feb. 22, 2018

(65) Prior Publication Data
US 2021/0301848 A1   Sep. 30, 2021

(30) Foreign Application Priority Data
Aug. 18, 2016 (BR) .................. BR 102016019163-7

(51) Int. Cl.
*F16B 5/01* (2006.01)
*A47B 96/20* (2006.01)
(Continued)

(52) U.S. Cl.
CPC .............. *F16B 5/01* (2013.01); *A47B 47/042* (2013.01); *A47B 96/205* (2013.01); *F16B 5/02* (2013.01)

(58) Field of Classification Search
CPC ..... A47B 96/205; A47B 47/042; B29C 48/07; F16B 12/26; F16B 5/0012; F16B 5/0016; F16B 2/20; F16B 2/22
See application file for complete search history.

(56) References Cited

U.S. PATENT DOCUMENTS

| | | | |
|---|---|---|---|
| 5,997,229 A * | 12/1999 | Akers | F16B 37/14 411/372.5 |
| 2008/0311355 A1 * | 12/2008 | Chen | B29C 48/12 428/195.1 |

(Continued)

FOREIGN PATENT DOCUMENTS

| | | | |
|---|---|---|---|
| BR | 9400065 A | 7/1994 | |
| DE | 202012102484 U1 * | 11/2013 | F16B 12/24 |

(Continued)

OTHER PUBLICATIONS

Rob Robillard, Applying Wood Veneer Edge Tape, Extreme How-To, available at https://extremehowto.com/applying-wood-veneer-edge-tape/, Published on Aug. 18, 2014 (Year: 2014).*

(Continued)

*Primary Examiner* — Moshe Wilensky
*Assistant Examiner* — Kyle A Cook
(74) *Attorney, Agent, or Firm* — Ostrolenk Faber LLP

(57) ABSTRACT

A method for manufacturing furniture using extruded polymeric honeycomb profiles, capable of providing the market with a sustainable product which can be exposed to moisture. The method includes three polymeric extruded honeycomb profiles, the extruded profile being fitted to the profile by inserting the flanges into the angled conformation, being anchored by the contact of the external flexible flaps with the flexible flaps. The union of profiles and provides an intermediate fitting allowing fixating the shelves, for example, being anchored by inserting the appendage into the angled conformations, fixating them through contact of the flexible external flanges with the external flexible flaps, allowing the formation of a three-part conjugation, being one profile and two profiles. The method allows the union of two profiles through the union of the external flexible flaps of the appendage, anchored to the internal flexible flaps of the flanges. After fitting the three profiles, which can be bottom, bases and shelves, the furniture is semi finished, the sides are mounted using profiles also fitted to the bottom, which refer (Continued)

to and position them, allowing the use of self-tapping screws attached to the hole of the support, allowing it to be anchored internally to the profiles, thus improving the finish in view of its honeycomb structure, after being finished with the cap to conceal the hole and the screw. The cutting edges are covered with adhesive border strips along the side walls, internal structural elements and supports.

2 Claims, 4 Drawing Sheets

(51) Int. Cl.
    *A47B 47/04*     (2006.01)
    *F16B 5/02*     (2006.01)

(56) References Cited

U.S. PATENT DOCUMENTS

| 2011/0135862 A1* | 6/2011 | Sumi | B32B 5/18 |
| | | | 428/36.91 |
| 2011/0280655 A1* | 11/2011 | Maertens | E04F 13/10 |
| | | | 403/375 |
| 2017/0071334 A1* | 3/2017 | Sitton | A47B 87/008 |

FOREIGN PATENT DOCUMENTS

| GB | 1138734 | 1/1969 | |
| GB | 2493572 A | 2/2013 | |
| WO | WO-2004069003 A1 * | 8/2004 | ............ F16B 12/20 |
| WO | WO 2013/020721 A1 | 2/2013 | |

OTHER PUBLICATIONS

Machine translation of DE-202012102484-U1 (Year: 2013).*
International Search Report dated Oct. 9, 2017 in corresponding PCT International Application No. PCT/BR2017/050225.
Written Opinion dated Oct. 9, 2017 in corresponding PCT International Application No. PCT/BR2017/050225.

* cited by examiner

METHOD FOR MANUFACTURING FURNITURE USING EXTRUDED POLYMER PROFILES

CROSS-REFERENCE TO RELATED APPLICATIONS

The present application is a 35 U.S.C. §§ 371 national phase conversion of PCT/BR2017/050225, filed Aug. 9, 2017, which claims priority to Brazilian Patent Application No. BR 10 2016 019163-7, filed Aug. 18, 2016, the contents of which are incorporated herein by reference. The PCT International Application was published in the Portuguese language.

FIELD OF APPLICATION

The present invention privilege relates to an innovative method for manufacturing furniture using extruded polymeric profiles, capable of providing the market with a sustainable product which can be exposed to moisture.

STATE OF THE ART

The environment has undergone profound transformations over the years, and in the midst of many global crises, it was realized that natural resources can be exhausted. Global warming, climate change and various natural disasters reinforce the need to rethink the consumption and use of these resources.

Even though we are thinking about industrial production, scientifically nothing is produced, but transformed by industry, which extracts the raw material, that is, resources produced by nature, which must be replaced, considering that humanity has a long history of destruction of the soil and forest cover, thus compromising the ecosystem.

Traditionally, the manufacture of residential and commercial furniture, for a long time, used wood as the main raw material. Noble woods, usually known as Hardwoods, of native origin, such as Mahogany, Cedar, and Cherry were widely exploited for a long time to this end until almost becoming extinct.

The scarcity of these resources, together with more severe environmental restrictions, such as Federal Law No. 9795/99, regulated by Decree No. 4281/02, which prohibits deforestation in environmental reserve areas, preventing the extraction of hardwood, forced different industry sectors, including the furniture industry, to seek alternative raw materials for this purpose.

As a result, the industry then adapted and began to offer the so-called Reconstituted Wood Boards, which uses wood as raw material, but of reforested origin, usually Pine or *Eucalyptus*, being therefore a renewable resource.

These boards may be of the Plywood type (wood logs transformed into thin sheets which are later joined with phenolic adhesives forming rigid panels); Agglomerate or MDP (Medium Density Particleboard—Medium Density Particle Boards) is a board of layered wood particles bonded with synthetic resin, subjected to high temperature and pressure; MDF (Medium Density Fiberboard)—Medium density fiber board. It is a medium density panel manufactured from wood fibers. The fibers bonded with synthetic resin are subjected to high temperature and pressure.

Currently, MDP and MDF together represent almost all furniture manufactured. However, these solutions discovered by the furniture industry present some difficulties and limitations, such as: production process in several stages; the durability and strength of these materials (MDF and MDP) considering their mechanical fragility over time, as well as their sensitivity to moisture, especially when the furniture is installed in environments and climatic regions with high rainfall and humidity, causing its deterioration, and the ensuing proliferation of fungi, molds, with strong and unpleasant Odors that can contaminate both kitchen utensils, groceries, and clothes in cabinets.

Another drawback of these alternatives is directly related to their disposal, since they are manufactured with a resin composed of urea and formaldehyde, a product whose use is controlled due to health concerns. This means that, even if it is used in products with a short life cycle, MDF is not recyclable or sustainable, being considered a Class IIA solid waste which cannot be incinerated or disposed directly in nature.

Another drawback is related to the manufacturing method, due to the requirements of logistics and movement, in the furniture production line, of the manufactured and standardized panels whose dimensions are of approximately 5 square meters, thus resulting in the use of large and heavy equipment for handling and making longitudinal and transverse cuts until they reach the intended dimensions of the furniture. Furthermore, a lot of waste is generated, both in the form of sawdust and in the form of scrap. Studies show that at best the scrap comprises approximately 5%, and can reach up to 35%. This waste cannot be disposed of or incinerated. After cutting, the exposed cutting faces receive protective borders to protect against moisture and providing finish. Transverse and longitudinal bores and grooves are machined to make possible the assembly of the furniture.

Finally, the main drawback is related to pests, since both MDF and MDP contain cellulose, which is a source of termite food.

Description of the Privilege of Invention

The object of the present invention privilege effectively solves the limitations found in the previously described furniture. This is achieved through an innovative furniture for manufacturing furniture from three extruded polymeric profiles. Profile A, in addition to allowing the bottom and top base B of the furniture to be fitted, allows an intermediate fitting of the shelves C. In addition, the profile A is modular and can be fitted to itself, allowing the use of combinations to change the height of the furniture to be manufactured. The system may or may not have small grooves in a "sawtooth" pattern which are simple to assemble and prevent disassembly before the furniture is finished. After fitting the 3 parts, bottom, bases and shelves, the furniture is semi finished, the sides B are also fitted to the bottom, which refer to and position them, making possible to conclude the assembly of the furniture with self-tapping screws.

This innovative method for manufacturing furniture using extruded polymeric profiles confers advantages over conventional furniture manufacturing methods:

Since it does not contain organic material, and it is impervious to moisture, the material does not propagate fungi, and may even form a physical barrier in case the wall behind the furniture has leaks or is contaminated;

low flammability;

ease of assembly, in view of the fact that all the extruded profiles have recesses that refer to and position the parts;

It does not contain cellulose, thus being immune to termites;

The extruded PVC panels are manufactured directly in the final dimensions of the furniture, which allows for a better use of the transported volume;

due to the fact that they are have a honeycomb structure, the weight per square meter is considerably reduced, in approximately 70%, thus increasing the transport capacity, reducing the number of freights and atmospheric emissions;

The product is fully in agreement with the pillars of sustainability since it helps to preserve the natural resources, as it can be recycled several times, preventing its disposal in the environment, since even at the end of its useful life it has commercial value as raw material.

DESCRIPTION OF THE FIGURES

In order to assist in the understanding of the present invention privilege, it will be described in greater detail, based on the following figures.

DETAILED DESCRIPTION OF THE PRIVILEGE OF INVENTION

Figure 1:
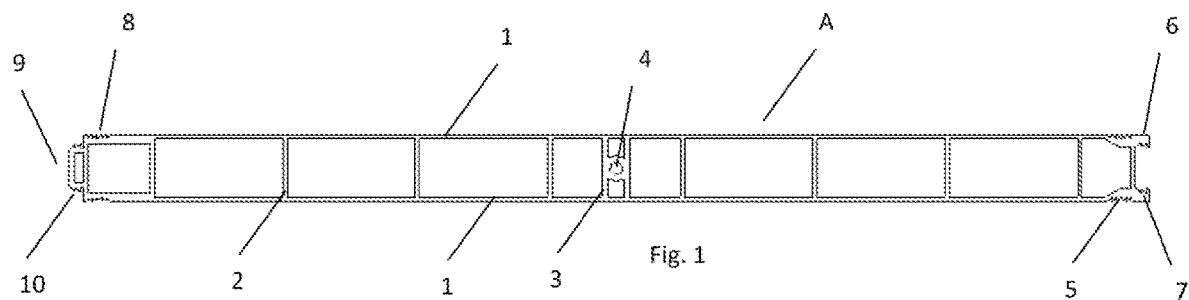
FIG. 1—cross-sectional view of profile A.
Figure 2:
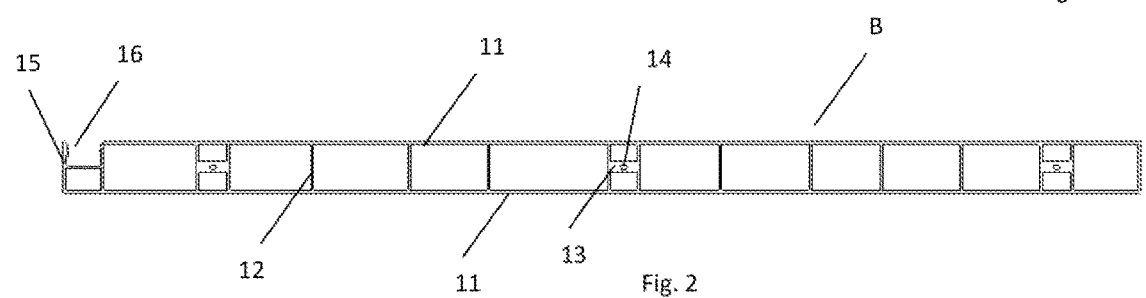
FIG. 2—cross-sectional view of profile B.
Figure 3:
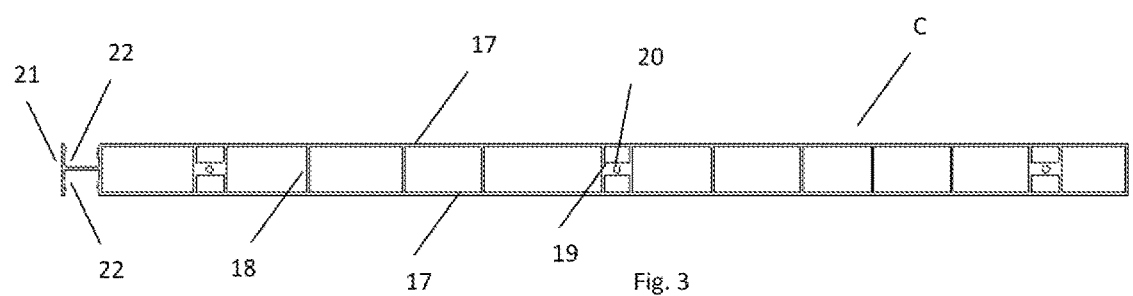
FIG. 3—cross-sectional view of profile A.
Figure 4:
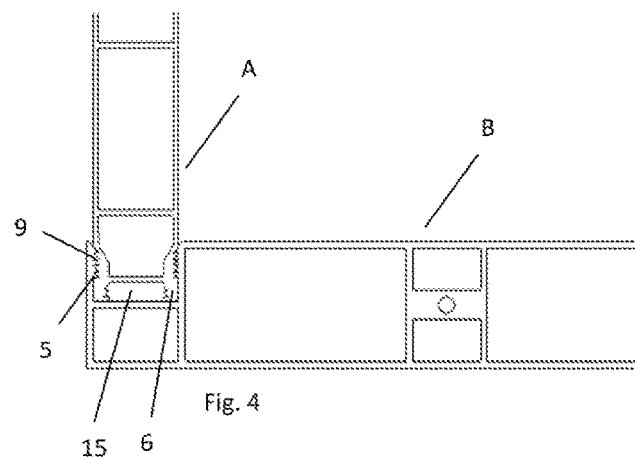
FIG. 4—cross-sectional view of the fitting element of profiles A and B.

According to FIGS. 1 to 10, the proposed furniture manufacturing method comprises the use of three extruded polymeric honeycomb profiles, the profile (A) being formed from a thin, elongated shape provided with external walls (1) supported by internal structural walls (2) showing at the center a support (3) capable of receiving the screw (D) through the holes (4). The lateral ends of profile (A) have on one side external flexible flaps (5), flanges (6) provided with internal flexible flaps (7). The opposite lateral end has external flexible flaps (8), and an appendage (9) provided with external flexible flaps (10).

Profile (B) is formed from a thin elongated shape provided with external walls (11) supported by internal structural walls (12) showing at the center a support (13) capable of receiving the screw (D) through the holes (14). The lateral end of profile (B) shows an angled conformation (15) internally provided with external flexible flaps (16). The opposite lateral end is smooth.

Profile (C) is formed from a thin, elongated shape provided with external walls (17) supported by internal structural walls (18) showing at the center a support (19) capable of receiving the screw (D) through the holes (20). The lateral end of profile (C) shows angled conformations (21) internally provided with external flexible flaps (22). The opposite lateral end is smooth.

Figure 5:
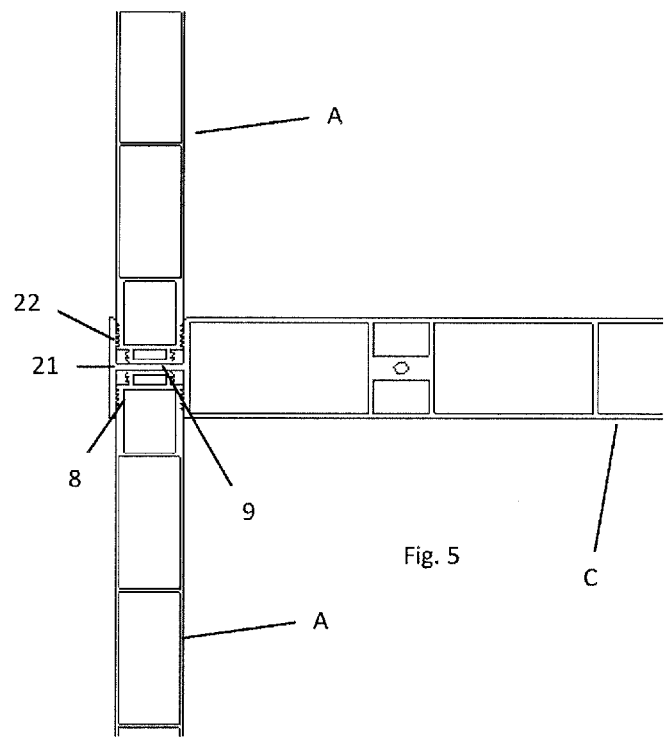
FIG. 5—cross-sectional view of the fitting element of profile C with two profiles A which form shelves.

The method proposed based on polymeric extruded profiles uses the extruded profile (A) fitted to the profile (B) through the insertion of the flaps (6) into the angled conformation (15), being anchored by the contact of the external flexible flaps (5) with the flexible flaps (9). The union of profiles (A) and (C) provides an intermediate fitting allowing fixating the shelves, for example, being anchored by inserting the appendage (9) into the angled conformations (21), fixating them through contact of the flexible external flanges (8) with the external flexible flaps (22), allowing the formation of a three-part conjugation, being one (C) profile and two (A) profiles, as shown in FIG. 5.

Figure 6:
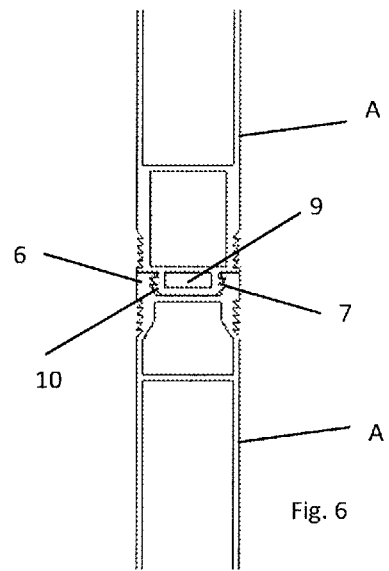
FIG. 6—cross-sectional view of the fitting of two profiles A.

The proposed method further allows joining two profiles (A), thus enabling combinations and variation in the height of the furniture to be manufactured through the union of the external flexible flaps (10) of the appendage (9), anchored to the internal flexible flaps (7) of the flanges (6), as shown in FIG. 6.

Figure 7:
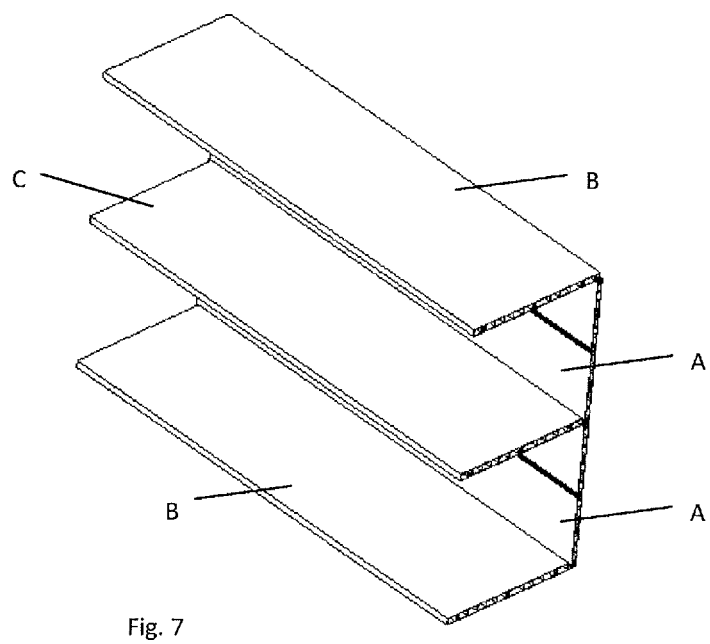
FIG. 7—view of a partial assembly of the furniture with profiles A, B, and C.
Figure 8:
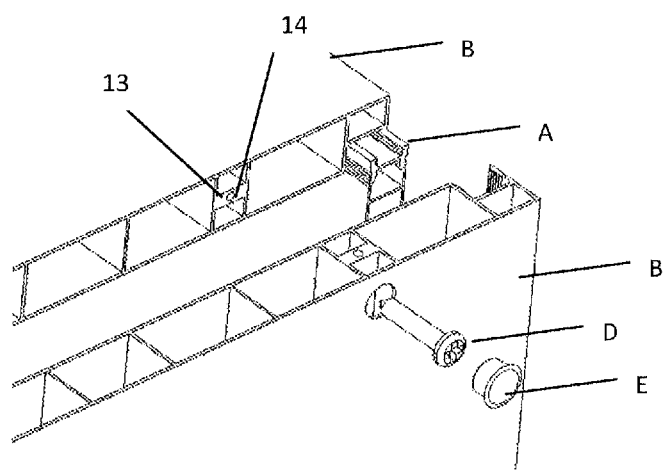
FIG. 8—exploded view of the fastening of the screws.
Figure 9:
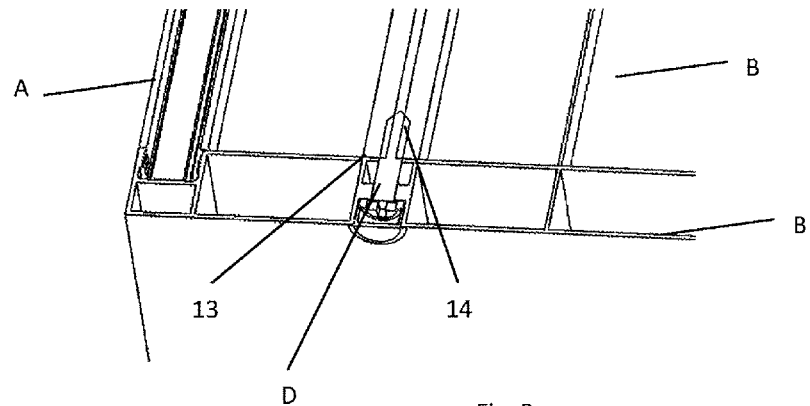
FIG. 9—cross-sectional view of the fastening of the screws.
Figure 10:
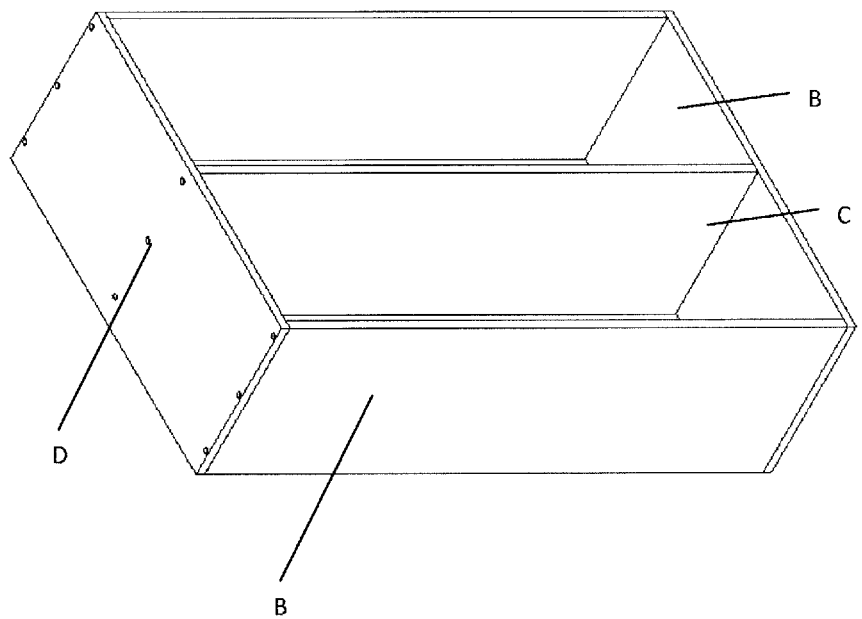
FIG. 10—view of the finished furniture.

After fitting the three profiles (A, B, and C), which can be bottom, bases and shelves, the furniture is semi finished, as shown in FIG. 7, the sides are mounted using profiles (B) also fitted to the bottom, which refer to and position them, allowing the use of self-tapping screws (D) attached to the holes (14) of the support (13), allowing it to be anchored internally to the profiles (A, B, and C) thus improving the finish due to its honeycomb structure, being afterwards finished with the cap (E) to conceal the hole and the screw. Finally, the cutting edges are covered with adhesive border strips along the side walls (1, 11, and 17), internal structural elements (2, 12, and 18) and supports (3, 13, and 19), providing an excellent finish to the furniture.

Alternatively, profiles (A, B, and C) can receive a wide variety of finishes on the external walls (1, 11, and 17), in order to confer an appearance of wood or other finishing, through the digital printing process.

The invention claimed is:

1. A method for manufacturing furniture, comprising:
assembling different polymeric, extruded, honeycomb profiles, the profiles including two first profiles (A), two second profiles (B), and a third profile (C), wherein each of the first profiles (A) is formed to have an elongated shape having external walls extending along a first direction and supported by internal structural walls, each of the first profiles having at a center thereof a support capable of receiving a screw through a hole, one lateral end of each first profile (A) is provided with first flexible flaps adjacent each external wall and facing opposite directions transverse to the first direction, and the one lateral end comprising spaced flanges adjacent the first flexible flaps and extending along the first direction, each flange being provided with second flexible flaps that face the second flexible flaps of the other flange and face a direction transverse to the first direction, an opposite lateral end of each first profile (A) is provided with third flexible flaps adjacent the external walls and facing opposite directions transverse to the first direction, the opposite lateral ends each comprising an appendage adjacent the respective third flexible flaps, each appendage having fourth flexible flaps facing opposite directions transverse to the first direction, each of the second profiles (B) is formed to have an elongated shape with external walls extending along a second direction and supported by internal structural walls, each of the second profiles having at a center thereof a support capable of receiving a screw through a hole, a lateral end of each of the second profiles (B) has an angled conformation that delimits a recess defined by a bottom that faces a direction transverse to the second direction, each of the angled conformations comprising a wall extending in a direction transverse to the second direction and that is spaced from the internal structural walls, each of the walls having fifth flexible flaps oriented toward the respective internal structural walls thereof, an opposite lateral end of each of the second profiles (B) is an end wall that extends between the external walls thereof and is flat such that each of the end walls is free from a projection, a lump or an indentation, and the third profile (C) is formed to have an elongated shape provided with external walls extending along a third direction and supported by internal structural walls, the third profile having at a center thereof a support capable of receiving a screw through a hole, a lateral end of the third profile (C) has angle conformations, each angled conformation of the third profile delimiting a recess defined by a bottom that faces a respective direction transverse to the third direction, the angled conformations of the third profile comprising respective walls extending in opposite directions transverse to the third direction, and each of the walls of the angled conformations of the third profile being provided with sixth flexible flaps oriented toward the internal structural walls thereof, and an opposite lateral end of the third profile (C) is an end wall that extends between the external walls thereof and is flat such that the end wall of the third profile is free from a projection, a lump or an indentation; wherein the assembling comprises:

inserting the first flexible flaps at the one lateral end of one of the first profiles (A) into the angled conformation of one of the second profiles (B) to couple the one of the first profiles and the one of the second profiles by contact between the first flexible flaps and the fifth flexible flaps of the one of the second profiles (B) to realize a bottom of the furniture;

inserting the first flexible flaps at the one lateral end of another one of the first profiles (A) into the angled conformation of another one of the second profiles (B) to couple the another one of the first profiles and the another one of the second profiles by contact between the first flexible flaps and the fifth flexible flaps of the another one of the second profiles (B) to realize a top of the furniture;

forming a portion of a back of the furniture by inserting the appendage of the one of the first profiles (A) into one of the angled conformations of the third profile (C) to couple the third flexible flaps to the sixth flexible flaps of the wall of the one of the angled conformations of the third profile to connect the one of the first profiles (A) and the one of the second profiles (B) with the third profile (C); and forming another portion of the back of the furniture by inserting the appendage of the another one of the first profiles (A) into another one of the angled conformations of the third profile (C) to couple the third flexible flaps to the sixth flexible flaps of the wall of the another one of the angled conformations of the third profile to connect the another one of the first profiles (A) and the another one of the second profiles (B) with the third profile (C), thereby providing an intermediate fitting that can serve as a shelf, whereby the second direction of the second profiles (B) and the third direction of the third profile (C) extend in a direction transverse to the first direction of the first profiles (A).

2. The method for manufacturing furniture of claim 1, further comprising:

providing a side;
  providing screws;
  assembling the side to
  the first profiles (A), the second profiles (B), and the third profile (C) by inserting first screws from the screws through the side and the holes (4) of the first profiles (A), inserting second screws from the screws through the side and the holes (14) of the second profiles (B), and a third screw from the screws in the hole (20) in the third profile (C).

* * * * *